United States Patent
Bekritsky et al.

(10) Patent No.: US 9,836,630 B2
(45) Date of Patent: Dec. 5, 2017

(54) SYSTEM FOR AND METHOD OF RAPIDLY DETERMINING TRUE BEARINGS OF RADIO FREQUENCY IDENTIFICATION (RFID) TAGS ASSOCIATED WITH ITEMS IN A CONTROLLED AREA

(71) Applicant: SYMBOL TECHNOLOGIES, INC., Lincolnshire, IL (US)

(72) Inventors: Benjamin J Bekritsky, Modiin (IL); Alexander M Jacques, Kings Park, NY (US); Michael J Koch, Fort Salonga, NY (US); Charles B Swope, Coral Springs, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 365 days.

(21) Appl. No.: 14/230,482

(22) Filed: Mar. 31, 2014

(65) Prior Publication Data
US 2015/0278565 A1 Oct. 1, 2015

(51) Int. Cl.
*G01S 3/46* (2006.01)
*G06K 7/10* (2006.01)
(Continued)

(52) U.S. Cl.
CPC ............ *G06K 7/10415* (2013.01); *G01S 3/46* (2013.01); *G01S 13/75* (2013.01); *G01S 13/751* (2013.01);
(Continued)

(58) Field of Classification Search
CPC .. G01S 13/4445; G01S 13/4454; G01S 13/75; G01S 13/878; G01S 3/74;
(Continued)

(56) References Cited

U.S. PATENT DOCUMENTS

| 4,353,073 A | 10/1982 | Brunner et al. |
| 5,066,956 A | 11/1991 | Martin |

(Continued)

FOREIGN PATENT DOCUMENTS

| CA | 2615245 A1 | 6/2008 |
| EP | 1758256 A1 | 2/2007 |

(Continued)

OTHER PUBLICATIONS

Patil et al., "An Emerging Anti Collision Protocol in RFID," 2010 National Conference on Advances in Recent Trends in Communication and Networks, Jan. 15-16, 2010, 3 pages.*

(Continued)

*Primary Examiner* — Steven Lim
*Assistant Examiner* — Kam Ma

(57) ABSTRACT

An RFID tag reading system and method accurately and rapidly determine true bearings of RFID tags associated with items in a controlled area. An RFID reader has an array of antenna elements and a plurality of RF transceivers. A controller controls the transceivers by steering a primary transmit beam over the controlled area to each tag, by steering a primary receive beam at a primary steering angle from each tag, by steering a plurality of secondary receive beams at different secondary steering angles that are offset from the primary steering angle by receiving secondary receive signals from each tag, and by processing the secondary receive signals to determine a true bearing for each tag. Bidirectional communication between the reader and a tag is conducted over a single inventory round in which the tag is read a plurality of times by the primary and the secondary receive beams.

20 Claims, 8 Drawing Sheets

(51) Int. Cl.
  *G01S 13/75* (2006.01)
  *G01S 13/82* (2006.01)
  *G01S 3/16* (2006.01)

(52) U.S. Cl.
  CPC ........ *G01S 13/825* (2013.01); *G06K 7/10099* (2013.01); *G06K 7/10128* (2013.01); *G06K 7/10366* (2013.01); *G01S 3/16* (2013.01)

(58) Field of Classification Search
  CPC . G01S 5/02; G01S 5/0278; G01S 5/04; G01S 5/12; G01S 3/46
  USPC ...................................................... 340/10.32
  See application file for complete search history.

(56) References Cited

U.S. PATENT DOCUMENTS

| | | | |
|---|---|---|---|
| 5,173,703 A | 12/1992 | Mangiapane et al. | |
| 5,181,040 A | 1/1993 | Inoue et al. | |
| 5,859,610 A | 1/1999 | Lenormand et al. | |
| 7,079,035 B2* | 7/2006 | Bock | A61B 5/02405 |
| | | | 340/573.1 |
| 7,250,902 B2 | 7/2007 | Manoogian et al. | |
| 7,310,045 B2* | 12/2007 | Inui | G01S 5/0247 |
| | | | 340/10.1 |
| 7,602,293 B2 | 10/2009 | Taki et al. | |
| 7,777,609 B2* | 8/2010 | Kuramoto | G01S 3/46 |
| | | | 340/10.1 |
| 7,928,894 B1 | 4/2011 | Fox | |
| 8,115,594 B2* | 2/2012 | Koezuka | G01S 13/58 |
| | | | 340/10.1 |
| 8,248,306 B2 | 8/2012 | Legay | |
| 8,305,265 B2 | 11/2012 | Ezal et al. | |
| 8,390,458 B2* | 3/2013 | Nonaka | G06K 7/0008 |
| | | | 340/572.7 |
| 8,427,370 B2 | 4/2013 | Pozgay | |
| 8,461,965 B2 | 6/2013 | Chen et al. | |
| 8,482,387 B2* | 7/2013 | Iwahashi | G01S 13/878 |
| | | | 235/384 |
| 8,493,182 B2 | 7/2013 | Hofer et al. | |
| 8,558,731 B1* | 10/2013 | Woodell | G01S 13/94 |
| | | | 342/118 |
| 8,577,308 B2 | 11/2013 | Choi | |
| 8,587,495 B2 | 11/2013 | Faraone et al. | |
| 8,952,844 B1* | 2/2015 | Wasiewicz | H04L 25/03019 |
| | | | 342/159 |
| 9,059,754 B2* | 6/2015 | Zhang | H04B 7/0617 |
| 9,177,180 B2* | 11/2015 | Sano | G06K 7/10019 |
| 9,361,494 B2 | 6/2016 | Swope et al. | |
| 2005/0110641 A1 | 5/2005 | Mendolia et al. | |
| 2005/0113138 A1 | 5/2005 | Mendolia et al. | |
| 2005/0280508 A1 | 12/2005 | Mravca et al. | |
| 2006/0181393 A1 | 8/2006 | Raphaeli | |
| 2007/0060802 A1* | 3/2007 | Ghevondian | A61B 5/0002 |
| | | | 600/301 |
| 2007/0080787 A1 | 4/2007 | Taki et al. | |
| 2007/0273530 A1* | 11/2007 | Koezuka | G01S 13/58 |
| | | | 340/572.7 |
| 2008/0157934 A1 | 7/2008 | Posamentier | |
| 2008/0157970 A1 | 7/2008 | Single et al. | |
| 2008/0180221 A1* | 7/2008 | Tuttle | G06K 7/0008 |
| | | | 340/10.2 |
| 2008/0224828 A1* | 9/2008 | Ando | G06K 7/0008 |
| | | | 340/10.4 |
| 2008/0297324 A1* | 12/2008 | Tuttle | H04Q 9/00 |
| | | | 340/10.33 |
| 2009/0002165 A1 | 1/2009 | Tuttle | |
| 2009/0073041 A1* | 3/2009 | Ferreol | G01S 3/74 |
| | | | 342/441 |
| 2009/0147625 A1* | 6/2009 | Pillai | G01S 3/74 |
| | | | 367/138 |
| 2009/0240120 A1* | 9/2009 | Mensinger | A61B 5/7445 |
| | | | 600/301 |
| 2010/0039228 A1* | 2/2010 | Sadr | G01S 5/12 |
| | | | 340/10.1 |
| 2010/0123617 A1 | 5/2010 | Yu et al. | |
| 2010/0151810 A1 | 6/2010 | Grau Besoli et al. | |
| 2010/0188211 A1 | 7/2010 | Brommer et al. | |
| 2010/0207738 A1 | 8/2010 | Bloy | |
| 2010/0225480 A1 | 9/2010 | Bloy et al. | |
| 2010/0231410 A1 | 9/2010 | Seisenberger et al. | |
| 2010/0237995 A1* | 9/2010 | Iwahashi | G06K 17/00 |
| | | | 340/10.1 |
| 2011/0006885 A1* | 1/2011 | Park | G06K 7/0008 |
| | | | 340/10.3 |
| 2011/0018691 A1* | 1/2011 | Park | G06K 7/0008 |
| | | | 340/10.2 |
| 2011/0050421 A1 | 3/2011 | Duron et al. | |
| 2011/0063095 A1* | 3/2011 | Tomiyama | G06K 7/0008 |
| | | | 340/12.51 |
| 2011/0133891 A1* | 6/2011 | Krug | G06K 7/0008 |
| | | | 340/10.1 |
| 2011/0169613 A1* | 7/2011 | Chen | G01S 13/4445 |
| | | | 340/10.4 |
| 2011/0270045 A1* | 11/2011 | Lebel | A61N 1/37211 |
| | | | 600/300 |
| 2012/0075073 A1 | 3/2012 | Fislage | |
| 2012/0139810 A1 | 6/2012 | Faraone et al. | |
| 2012/0189078 A1 | 7/2012 | Eom | |
| 2012/0248187 A1 | 10/2012 | Piazza et al. | |
| 2012/0262358 A1 | 10/2012 | Wallner | |
| 2012/0314791 A1* | 12/2012 | Zhang | H04B 7/0617 |
| | | | 375/267 |
| 2013/0021141 A1 | 1/2013 | Brommer et al. | |
| 2013/0099898 A1 | 4/2013 | Bloy | |
| 2013/0106671 A1 | 5/2013 | Eom | |
| 2013/0113669 A1 | 5/2013 | Bellows | |
| 2013/0127620 A1* | 5/2013 | Siebers | G08B 21/02 |
| | | | 340/573.1 |
| 2013/0201003 A1 | 8/2013 | Sabesan et al. | |
| 2014/0104125 A1* | 4/2014 | Choiniere | H01Q 3/08 |
| | | | 343/761 |
| 2014/0197928 A1* | 7/2014 | Jacques | G01S 3/28 |
| | | | 340/10.3 |
| 2014/0201423 A1* | 7/2014 | Jean | G06F 12/0246 |
| | | | 711/103 |
| 2014/0266894 A1* | 9/2014 | Rasheed | H01Q 3/34 |
| | | | 342/367 |
| 2014/0361078 A1 | 12/2014 | Davidson | |
| 2015/0123869 A1* | 5/2015 | Bit-Babik | H01Q 3/247 |
| | | | 343/857 |
| 2015/0169910 A1* | 6/2015 | Koch | G06K 7/10366 |
| | | | 340/10.1 |
| 2015/0278565 A1* | 10/2015 | Bekritsky | G06K 7/10366 |
| | | | 340/10.32 |
| 2015/0323662 A1 | 11/2015 | Swope et al. | |
| 2016/0001803 A1* | 1/2016 | Kim | G01S 13/06 |
| | | | 246/124 |
| 2016/0003930 A1* | 1/2016 | Swope | G06K 7/10475 |
| | | | 342/368 |
| 2016/0103198 A1* | 4/2016 | Swope | G01S 3/046 |
| | | | 342/372 |
| 2016/0152350 A1 | 6/2016 | Puentes et al. | |
| 2017/0109555 A1 | 4/2017 | Koch et al. | |

FOREIGN PATENT DOCUMENTS

| | | |
|---|---|---|
| WO | 199200531 | 1/1992 |
| WO | 2008082434 A2 | 7/2008 |
| WO | 2009151778 A2 | 12/2009 |
| WO | 2011135328 A2 | 11/2011 |
| WO | 2014113363 A1 | 7/2014 |

OTHER PUBLICATIONS

International Search Report and Written Opinion dated Jun. 22, 2015 in counterpart PCT application PCT/US2015/021486.

(56) References Cited

OTHER PUBLICATIONS

EPC Global, Specification for RFID Air Interface, EPC™ Radio-Frequency Identity Protocols Class-1 Generatioin-2 UHF RFID Protocol for Communications at 860 MHz-960MHz, Version 1.2.0, Oct. 23, 2008.
Hajime Sakamoto and Peyton Z. Peebles, Jr., "Conopulse Radar" IEEE Transactions on Aerospace and Electronic Systems, vol. AES-14, No. 1 (Jan. 1978).
Toby Haynes, "A Primer on Digital Beamforming", Spectrum Signal Processing (Mar. 26, 1998).
Spong, "An Efficient Method for Computing Azimuth and Elevation Angle Estimates from Monopulse Ratio Measurements of a Phased Array Pencil Beam Radar with Two-Dimensional Angle Steering," Radar Conference, 1999, The Record of the 1999 IEEE (Apr. 20, 1999).
International Search Report and Written Opinion dated Apr. 4, 2014 for International Patent Application No. PCT/US2014/011411.
International Search Report and Written Opinion dated Mar. 6, 2015 for International Patent Application No. PCT/US2014/069112.
International Search Report and Written Opinion dated Aug. 5, 2015 for International Patent Application No. PCT/US2015/029423.
International Search Report and Written Opinion for International Patent Application No. PCT/US2016/056333 dated May 9, 2017.

\* cited by examiner

SYSTEM FOR AND METHOD OF RAPIDLY DETERMINING TRUE BEARINGS OF RADIO FREQUENCY IDENTIFICATION (RFID) TAGS ASSOCIATED WITH ITEMS IN A CONTROLLED AREA

CROSS REFERENCE TO RELATED APPLICATION

The present disclosure is related to U.S. patent application Ser. No. 14/106,368, filed Dec. 13, 2013, the entire contents of which are hereby incorporated herein by reference thereto.

BACKGROUND OF THE INVENTION

The present disclosure relates generally to a system for, and a method of, rapidly and efficiently determining true bearings of radio frequency (RF) identification (RFID) tags associated with items in a controlled area, especially for inventory control of the RFID-tagged items, by using an array of antenna elements for better RF coverage.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about the controlled area. Each RFID reader interrogates one RFID tag, and preferably many more RFID tags, in its coverage range. Each RFID tag is usually attached to, or associated with, an individual item, or to a package for the item, or to a pallet or container for multiple items. Each RFID reader transmits an RF interrogating signal, and each RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag. The return signal is demodulated and decoded into data by each reader, which thereby identifies, counts, or otherwise interacts with the associated item. The decoded data, also known as a payload, can denote a serial number, a price, a date, a destination, other attribute(s), or any combination of attributes, and so on.

The RFID tag typically includes an antenna, a power management section, a radio section, and frequently a logic section containing a control microprocessor, a memory, or both. In earlier RFID tags, the power management section included an energy storage device, such as a battery. An RFID tag with an active transmitter is known as an active tag. An RFID tag with a passive transmitter is known as a passive tag and backscatters. Advances in semiconductor technology have miniaturized the electronics so much that an RFID tag can be powered solely by the RF signal it receives. An RFID tag that backscatters and is powered by an on-board battery is known as a semi-passive tag.

The RFID system is often used in an inventory monitoring application. For example, in order to take inventory of RFID-tagged items in a retail store, it is known to position at least one RFID reader in a controlled area, and then, to allow each reader to automatically read whatever tagged items are in the coverage range of each reader. The number of tagged items is not typically known in advance. The RFID system is preferably configured to operate in accordance with a known standard or protocol, for example, the Electronic Product Code (EPC) global UHF Generation-2 Standard (EPC Gen-2). A detailed description of the EPC Gen-2 Standard can be found in a publication entitled "*EPC Radio-Frequency Identity Protocols Class-*1 *Generation-*2 *UHF RFID Protocol for Communications at* 860 *MHz-*960 *MHz*", Version 1.2.0, published on Oct. 23, 2008, by EPC Global, Inc.

According to the EPC Gen-2 Standard, the reader, among other things, optionally selects which tag or tags are going to be interrogated by the reader with an optional Select command, and estimates the total number of tags rounded up to the next power of 2, thereby specifying the number of time slots in the reader for the tags to use, and queries each tag, in its turn, with a Query command, and/or subsequent optional Query Repeat (QueryRep) and/or Query Adjust (QueryAdj) commands, perhaps more than once, to pick a random slot. In response, each successive tag replies with a 16-bit, random number (RN16), and the reader acknowledges the random number with an ACK command. The tag can now send its payload, i.e., its EPC or identification (tag ID), to the reader. An inventory round is defined as a time period initiated by a Query command, and terminated by either a subsequent Query command (which also starts a new inventory round), or a Select command. A QueryRep command is a command that asks the tag to decrement its slot counter. A QueryAdj command is a command that asks the tag to re-pick a slot.

For superior RF coverage, it is known to provide each reader with an array of antenna elements that transmit the RF interrogating signal as a primary transmit beam that is electronically steered both in azimuth, e.g., over an angle of 360 degrees, and in elevation, e.g., over an angle of about 90 degrees, and that receive the return RF signal via a primary receive beam from the tags. Each primary transmit and receive beam must be cycled through the aforementioned inventory round.

As advantageous as such known inventory-taking RFID systems utilizing antenna arrays have been, it has proven difficult in practice to accurately determine the true bearing, i.e., the angular direction both in azimuth and elevation, of a particular tag, relative to a particular reader. There is a practical limit on the number of antenna elements that can be used in each array. This antenna element limit causes each primary transmit beam and each corresponding primary receive beam to have a relatively broad beam width. The primary transmit beam is typically steered until the reader reads the tag with the highest or peak receive signal strength (RSS) of the primary receive beam at a primary steering angle. However, determining the bearing, i.e., the angular direction both in azimuth and elevation, of a tag based on the peak RSS of the primary receive beam is imprecise due to the aforementioned relatively broad beam width. Bearing errors on the order of 5 to 10 degrees have been reported and are not tolerable in many applications.

In order to more accurately determine the true bearing, it has been proposed in the above-identified patent application to generate multiple secondary receive beams pointing in different directions to independently measure the peak RSS for a particular tag. However, each of the multiple secondary receive beams must be individually cycled through its own individual inventory round. This is a relatively slow process, because each inventory round takes time, e.g., on the order of 10 milliseconds for each secondary receive beam. It also takes more milliseconds to switch among the secondary receive beams. The total amount of time it takes for each inventory round for each secondary receive beam directly impacts how many tags can be read, or degrades the quality of the bearing determination of any single tag since fewer readings will be taken for that tag.

Accordingly, there is a need to more rapidly and accurately determine the true bearings of RFID tags despite the practical limit on the number of antenna elements that can be used in an antenna array, and despite the relatively broad beam width of the primary transmit and receive beams, and despite the time that it ordinarily takes to process multiple secondary receive beams over multiple inventory rounds.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
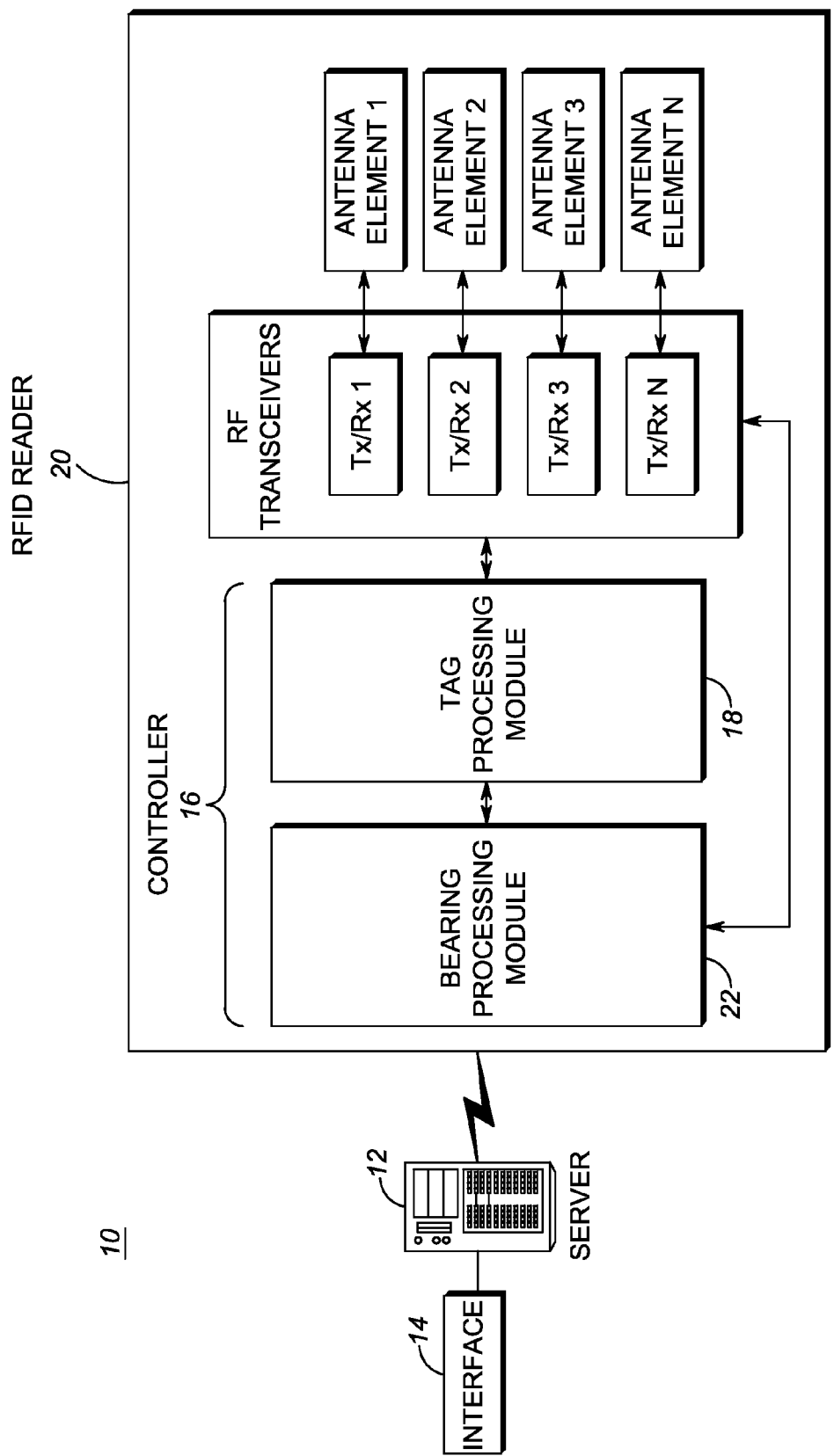
FIG. 1 is a schematic view of an exemplary radio frequency identification (RFID) tag reading system for rapidly determining true bearings of RFID tags in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to a radio frequency (RF) identification (RFID) tag reading system for rapidly determining true bearings of RFID tags associated with items in a controlled area. The controlled area may be a retail store, a warehouse, or any other confined or open area in which RFID-tagged items are to be monitored. The system includes an RFID reader having an array of antenna elements, e.g., a phased array; a plurality of RF transceivers; and a controller or programmed microprocessor operatively connected to the transceivers, and operative for controlling the transceivers in one or more scans or modes of operation.

The controller initially executes a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag. The controller thereupon executes a bearing processing module operative for steering a plurality of secondary receive beams at different secondary steering angles that are offset from the primary steering angle by receiving a plurality of secondary receive signals via the antenna elements from each tag, and by processing the secondary receive signals to determine a true bearing for each tag.

In accordance with the present disclosure, the controller also controls bidirectional communication between the reader and at least one of the tags over a single inventory round in which the at least one tag is read a plurality of times by the primary and the secondary receive beams. The multiple secondary receive beams may be steered simultaneously or sequentially. Hence, in contrast to the prior art in which each of the multiple secondary receive beams must be individually cycled through its own individual lengthy inventory round, this invention proposes that each of the multiple primary and secondary receive beams be cycled over a single inventory round. The less time that it takes for each secondary receive beam to be processed, the greater the number of tags that can be read, and the better the quality of reading a single tag since more measurements can be taken in a given time period.

More specifically, in a preferred embodiment, the reader is operative for querying at least one tag to pick a random slot with at least one of a Query command, a Query Repeat (QueryRep) command, and a Query Adjust (QueryAdj) command, and for acknowledging a random number selected by the tag with an ACK command. Once the random number has been acknowledged, the controller receives a tag identification from the tag during steering of the primary receive beam, and switches from the primary receive beam to each of the secondary receive beams without repeating any of the Query, QueryRep, and QueryAdj commands, and receives a tag identification from the tag during steering of each of the secondary receive beams.

Preferably, the bearing processing module is operative for steering a first pair of the secondary receive beams at opposite sides of the primary receive beam in elevation, and for processing a first pair of the secondary receive signals to obtain a pair of elevation offset signals. The bearing processing module is further operative for steering a second pair of the secondary receive beams at opposite sides of the primary receive beam in azimuth, and for processing a second pair of the secondary receive signals to obtain a pair of azimuth offset signals. The bearing processing module is still further operative for processing the elevation offset signals by dividing their difference by their sum to obtain an elevation error signal as an elevation correction to the primary steering angle, and for processing the azimuth offset signals by dividing their difference by their sum to obtain an azimuth error signal as an azimuth correction to the primary steering angle. Thus, the primary steering angle is corrected by these error signals, thereby resulting in the true bearing for each tag, as well as a rapid correction.

A method, in accordance with another aspect of this disclosure, relates to a radio frequency (RF) identification (RFID) tag reading method of rapidly determining true bearings of RFID tags associated with items in a controlled area. The method is performed by mounting an RFID reader having an array of antenna elements and a plurality of RF transceivers, in the controlled area; controlling the transceivers by having a controller execute a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag; controlling the transceivers by having the controller execute a bearing processing module operative for steering a plurality of secondary receive beams at different secondary steering angles that are offset from the primary steering angle by receiving a plurality of secondary receive signals via the antenna elements from each tag, and by processing the secondary receive offset signals to determine a true bearing for each tag; and controlling bidirectional communication between the reader and at least one of the tags over a single inventory round in which the at least one tag is read a plurality of times by the primary and the secondary receive beams.

Turning now to the drawings, FIG. 1 depicts a simplified depiction of a radio frequency (RF) identification (RFID) tag reading system 10 for rapidly determining true bearings of RFID tags associated with items to be tracked or monitored. The system 10 has an RFID reader 20 connected to a server or host 12 and a user interface 14. The RFID reader 20 has an array of antenna elements 1, 2, 3 . . . , N, preferably a phased array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers may be employed. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation in one or more scans or modes of operation, as described below. The controller 16 executes a software-based, tag processing module 18 during an initial coarse scan and a subsequent fine scan, and also executes a software-based, bearing processing module 22 during the fine scan. The modules 18 and 22 need not be software-based, but either or both of them could be hardware-based, or could be implemented in both software and hardware. The coarse and fine scans need not be separate distinct scans, but can be successively performed in a single scan. Although the bearing processing module 22 is depicted in FIG. 1 as being implemented in the RFID reader 20, it will be understood that the bearing processing module 22, either in whole or in part, can also be implemented in the server 12.

Figure 2:
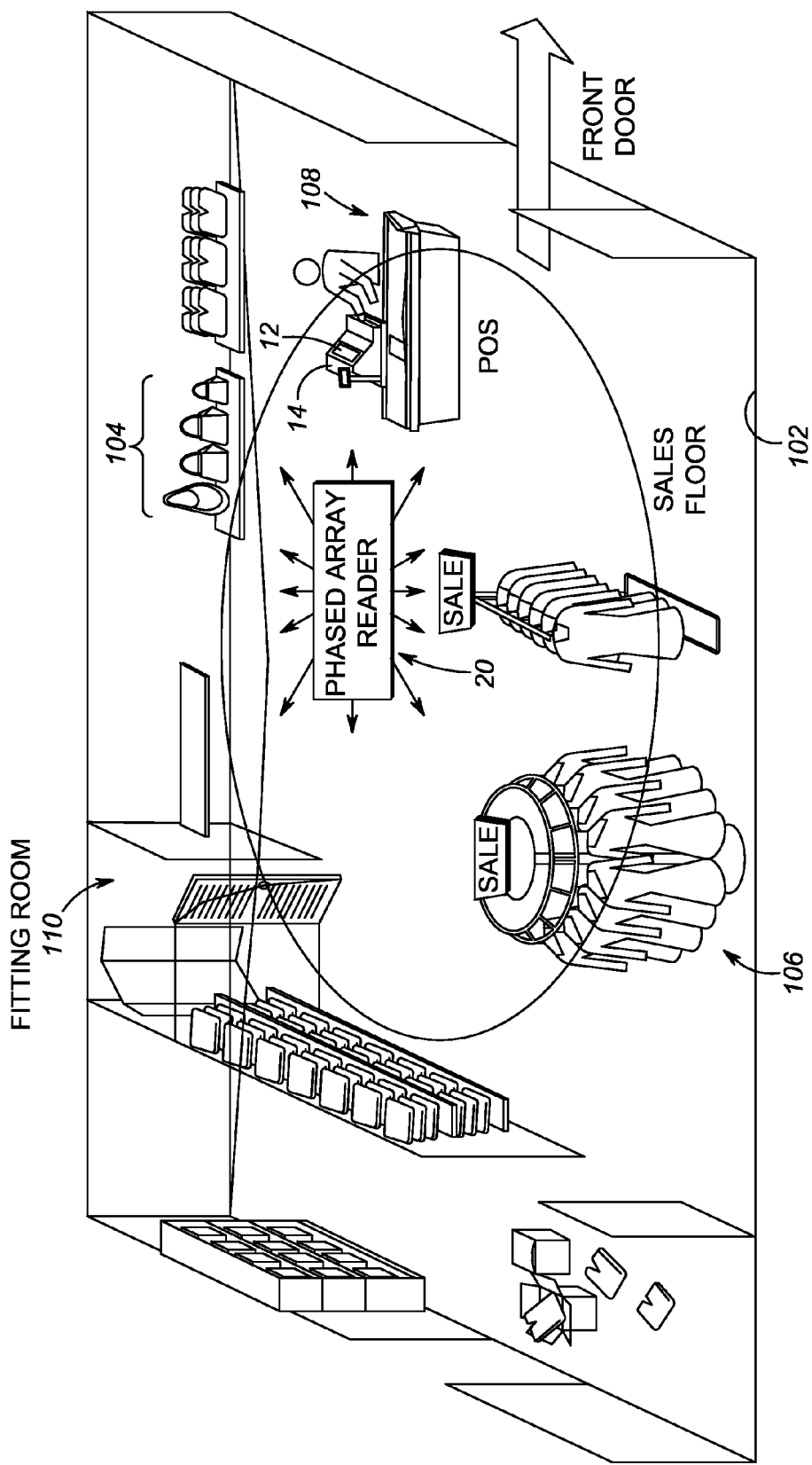
FIG. 2 is a perspective, schematic view of the system of FIG. 1 installed in an exemplary controlled area, especially for inventory control of RFID-tagged items.

FIG. 2 depicts an exemplary depiction of the RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag for cost reasons, although other types of RFID tags, as described above, may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 advantageously includes a wireless RF transceiver that communicates with the reader 20. For example, Wi-Fi and Bluetooth® are open wireless standards for exchanging data between electronic devices.

Figure 3A:
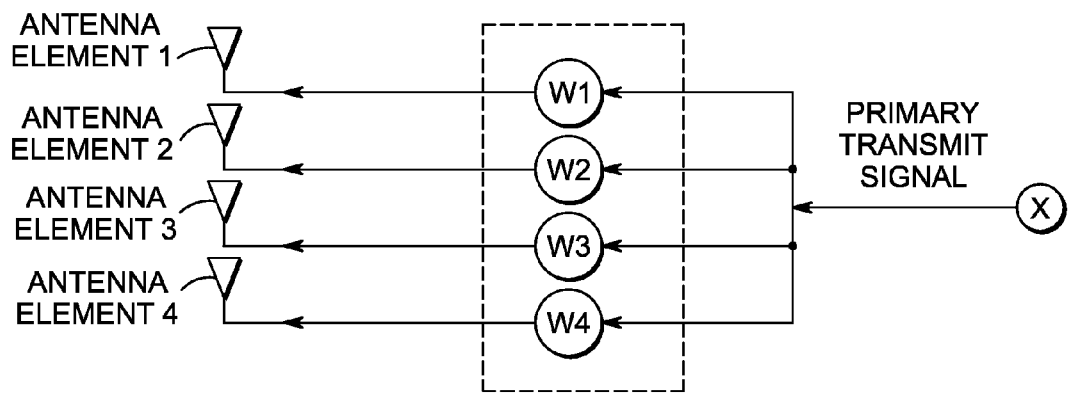
FIG. 3A is a schematic diagram depicting components of the overall system of FIG. 1 during transmission of the primary transmit beam.
Figure 3B:
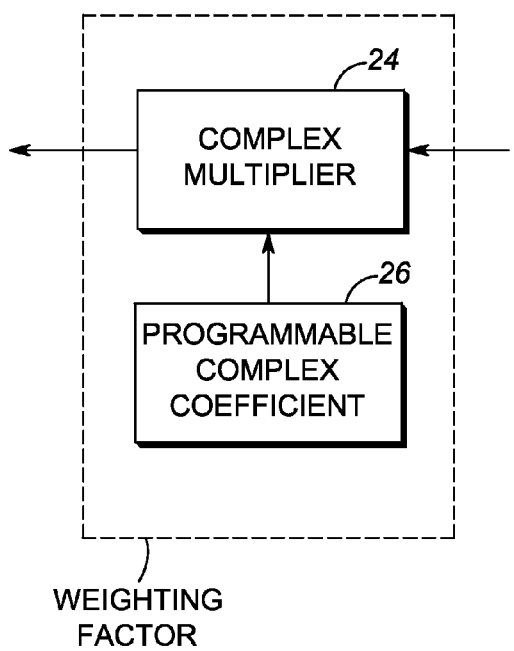
FIG. 3B is a block diagram depicting a detail of a weighting factor component for use in beam steering in the system.

During execution of the aforementioned initial or coarse scan, the controller 16 executes the tag processing module 18 by which the transceivers are commanded to act as a primary transmit beam steering unit operative for steering a primary transmit beam over the controlled area 102 by transmitting a primary transmit signal (X) via the antenna elements to each tag. As shown in FIG. 3A, the primary transmit signal (X) is conducted along different channels (in this example, four) to a plurality of the antenna elements 1, 2, 3 and 4. Steering is accomplished by introducing a different weighting factor W1, W2, W3 and W4 on each channel. As shown in FIG. 3B, each weighting factor is generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587,495 and/or to "A Primer on Digital Beamforming", by Toby Haynes, in Spectrum Signal Processing, Mar. 26, 1998, the entire contents of said patent and said primer being incorporated herein by reference thereto.

Figure 4:
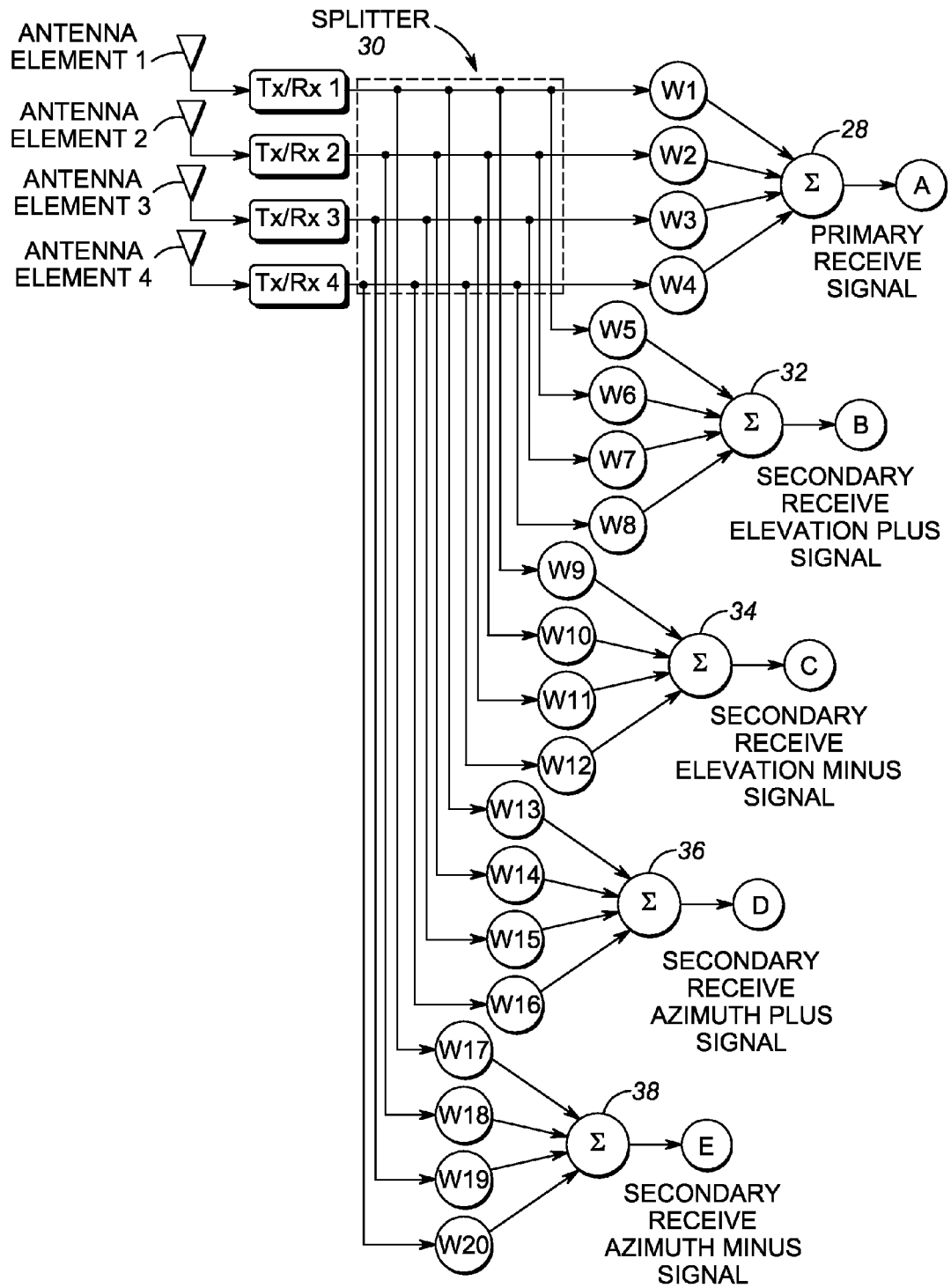
FIG. 4 is a schematic diagram depicting components of the overall system of FIG. 1 during reception of the primary receive beam, as well as of additional secondary receive beams.

During the coarse scan, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. As shown in FIG. 4, the antenna elements 1, 2, 3 and 4 receive return signals from each interrogated tag along different channels (in this example, four), and then a different weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam is effected by the weighting factors W1, W2, W3 and W4. As illustrated, the weighting factors (FIG. 4) used in steering the primary receive beam is, in a preferred embodiment, the same as the weighting factors (FIG. 3A) used in steering the primary transmit beam. As a result, the steering angle for both the primary transmit beam and the primary receive beam is the same, or nearly so, i.e., they have a common boresight or general bearing. However, it will be understood that the weighting factors used in steering the primary receive beam may be different from the weighting factors used in steering the primary transmit beam, in which case, the steering angle for the primary transmit beam is different from the steering angle for the primary receive beam.

As described above, the practical limit on the number N of antenna elements that can be used in the array causes the primary transmit beam and the corresponding primary receive beam to each have a relatively broad beam width, thereby rendering it difficult in practice to very accurately determine the true bearing, i.e., the angular direction both in azimuth and elevation, of a particular tag, relative to the reader. Bearing errors on the order of 5 to 10 degrees have been reported and are not tolerable in many applications. One aspect of this disclosure is directed to reducing such errors, preferably to less than one degree.

As further shown in FIG. 4, the return signals from each interrogated tag from the antenna elements 1, 2, 3 and 4 are conducted through respective RF transceivers Tx/Rx 1, Tx/Rx 2, Tx/Rx 3, Tx/Rx 4, to a splitter 30, and then routed to four sub-circuits to simultaneously generate four different secondary receive signals, and four different secondary receive beams that are offset from the primary receive beam, as described below. Thus, the return signals are conducted from the splitter 30 to weighting factors W5, W6, W7 and W8 before being summed in an adder 32 to generate a secondary receive plus elevation signal (B), to weighting factors W9, W10, W11 and W12 before being summed in an adder 34 to generate a secondary receive minus elevation signal (C), to weighting factors W13, W14, W15 and W16 before being summed in an adder 36 to generate a secondary receive plus azimuth signal (D), and to weighting factors W17, W18, W19 and W20 before being summed in an adder 38 to generate a secondary receive minus azimuth signal (E). Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20.

Each weighting factor W5 through W20 is generated by a circuit identical to that depicted in FIG. 3B. The weighting factors W5, W6, W7 and W8 are selected such that the secondary receive beam formed by the plus elevation signal (B) has a steering angle that is located a few degrees, e.g., ten degrees, in one direction away from the elevation of the primary steering angle of the primary receive beam, and the weighting factors W9, W10, W11 and W12 are selected such that the secondary receive beam formed by the minus elevation signal (C) has a steering angle that is located a few degrees, e.g., ten degrees, in an opposite direction away from the elevation of the primary steering angle of the primary receive beam. The weighting factors W13, W14, W15 and W16 are selected such that the secondary receive beam formed by the plus azimuth signal (D) has a steering angle that is located a few degrees, e.g., ten degrees, in one direction away from the azimuth of the primary steering angle of the primary receive beam. The weighting factors W17, W18, W19 and W20 are selected such that the secondary receive beam formed by the minus azimuth signal (E) has a steering angle that is located a few degrees, e.g., ten degrees, in an opposite direction away from the azimuth of the primary steering angle of the primary receive beam.

Thus, four secondary receive beams have been formed. The secondary receive beams may be formed simultaneously or sequentially. The secondary receive beams formed by the plus and minus elevation signals (B) and (C) bracket the elevation of the primary receive beam. The secondary receive beams formed by the plus and minus azimuth signals (D) and (E) bracket the azimuth of the primary receive beam. The terms "plus" and "minus", as used herein to describe the signals (B), (C), (D), and (E), are intended to describe the opposite directions in which the secondary receive beams are steered.

Figure 5:
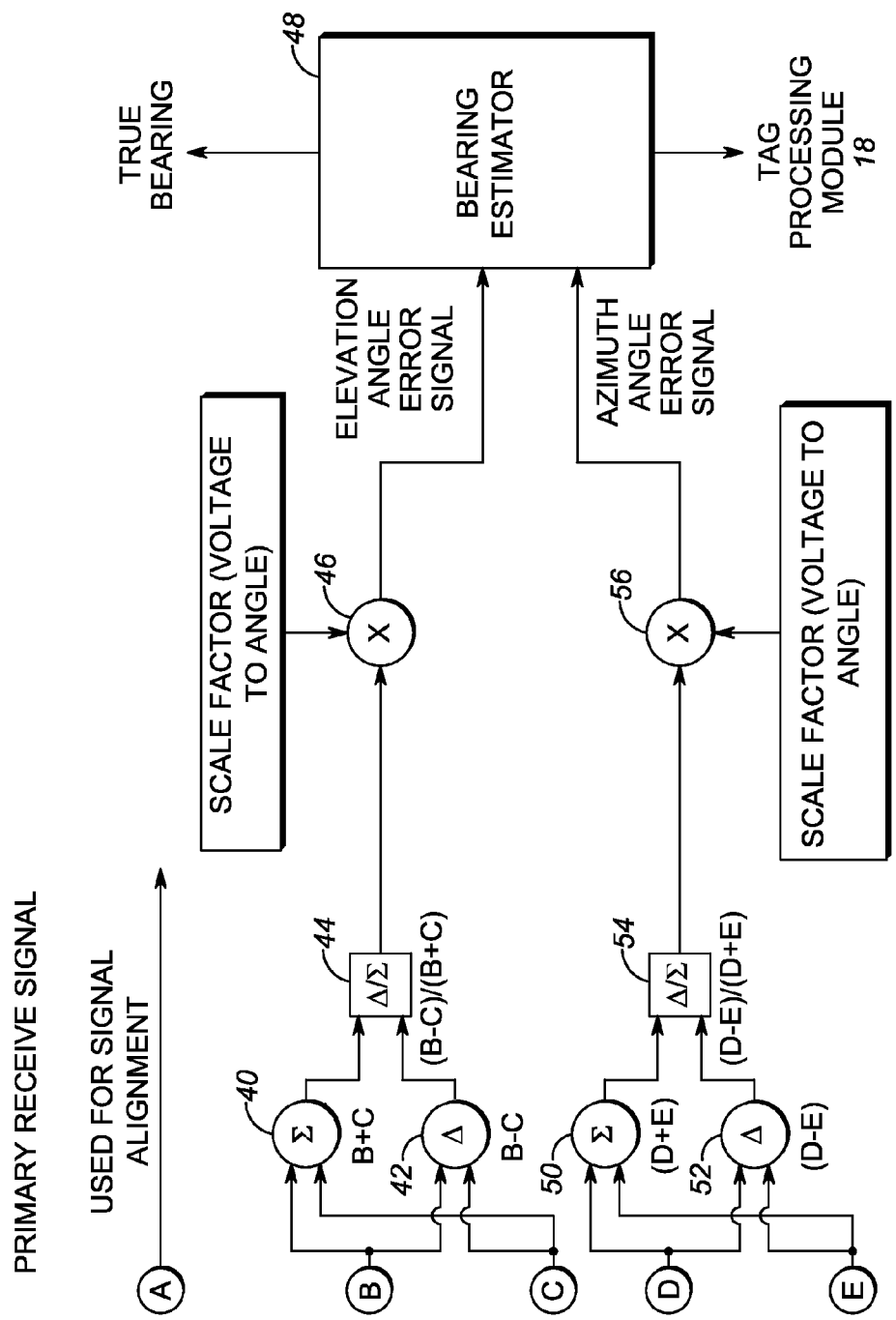
FIG. 5 is a block diagram depicting signal processing of the primary and the secondary receive beams depicted in FIG. 4 to obtain a true bearing for each RFID-tagged item.

Turning now to FIG. 5, the elevation signals (B) and (C) and the azimuth signals (D) and (E) are separately processed to obtain elevation and azimuth bearing correction factors used to determine the true bearing of each interrogated tag. Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48. The bearing estimator 48 compares the two elevation and azimuth angle error signals against the elevation and azimuth of the primary receive signal (A), and outputs a true bearing for each interrogated tag. This output can be stored, or sent to the server 12, or it can be sent to the tag processing module 18 for beam steering.

As described so far, four of the antenna elements are employed to steer the four secondary receive beams around the primary transmit and receive beams. In another embodiment, sixteen RF transceivers may be used to connect to sixteen antenna elements, and the beams corresponding to signals (A), (B), (C), (D), and (E) may be formed using a circuit that employs sixteen complex multipliers. In yet another embodiment, sixteen antenna elements are employed in the array, and a switch is used to switch the same four RF transceivers to four of the sixteen antenna elements. At any given time, four out of the sixteen antenna elements are active, while the remaining twelve antenna elements are inactive. These four antenna elements are effectively working in one volume or sector of space in the controlled area 102. The remaining antenna elements in the array are preferably working successively or sequentially in the same or in different volumes or sectors of space in the controlled area. The antenna elements work in groups, typically four at a time, and advantageously, there may be overlap between antenna elements in the different groups. It will be understood that this disclosure is not intended to be limited to a group of four antenna elements, because a different number or group of antenna elements, and a different number or group of secondary receive beams, could be employed.

As described above, four separate subcircuits are employed, as shown in FIG. 4, to simultaneously generate the two elevation signals (B) and (C) and the two azimuth signals (D) and (E), and to simultaneously steer their secondary receive beams. In a time-multiplexed variation, one or more such subcircuits can be shared. For example, only one such subcircuit could be employed, and different sets of weighting factors could be sequentially applied at the one such subcircuit to sequentially generate the signals (B), (C), (D) and (E), and to sequentially steer their secondary receive beams.

Figure 6:
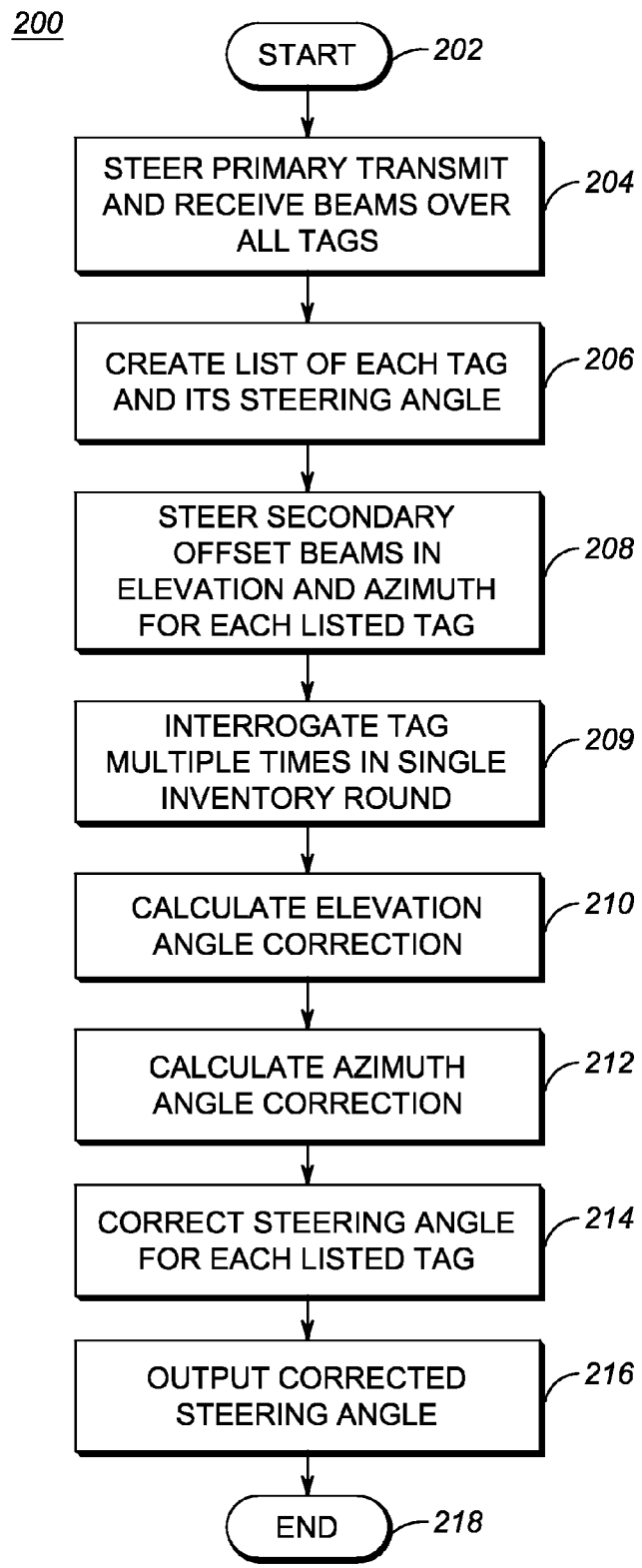
FIG. 6 is a flow chart depicting steps performed in accordance with a method of rapidly determining true bearings of RFID tags associated with items in the controlled area in accordance with the present disclosure.

As described above, and as shown in the flow chart 200 of FIG. 6, beginning at start step 202, the RFID system 10 accurately determines the true bearings of RFID tags associated with the items 104, 106 in the controlled area 102 by steering the primary transmit beam and the primary receive beam over all the tags (step 204), and by creating a list of all the tags that were read, together with the primary steering angle of the primary receive beam having the highest RSSI level for each tag that was read (step 206). Then, for each such listed tag, the system steers a set of secondary receive beams at steering angles that are offset in elevation and azimuth relative to the elevation and azimuth of the primary steering angle of the primary receive beam (step 208). The listed tags may be re-read, once or multiple times, for each offset beam. Then, for each listed tag, the system calculates an elevation angle correction for the elevation of the primary steering angle (step 210) by dividing a difference and a sum of receive elevation offset signals for the elevation offset beams. Similarly, for each listed tag, the system calculates an azimuth angle correction to the azimuth of the primary steering angle (step 212) by dividing a difference and a sum of receive azimuth offset signals for the azimuth offset beams. Next, the steering angle is corrected for each listed tag (step 214), and the corrected steering angle, i.e., the true bearing for each listed tag is output (step 216). The method ends at step 218. The step 209 depicted in FIG. 6 is described below in connection with FIG. 8. In one embodiment, all the tags can be read, and then the reader can go back to each tag and determine its bearing. In another embodiment, the bearing of each tag is determined not as a subsequent activity.

Figure 7:
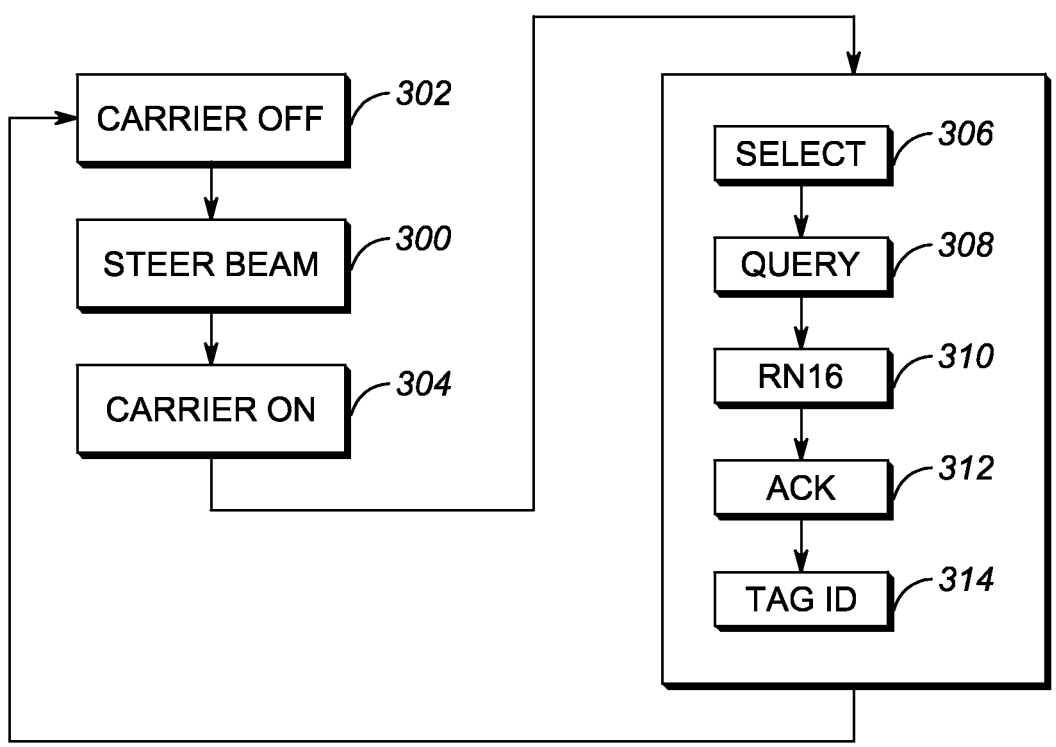
FIG. 7 is a block diagram depicting an inventory round for a primary transmit beam and a primary receive beam in accordance with the prior art.

The present disclosure is more particularly directed to expediting the determination of the true bearing for each tag by controlling bidirectional communication between the reader and the tag. In the prior art, as illustrated in FIG. 7, the primary transmit beam and/or the primary receive beam are steered at step 300 over the controlled area in which the tags are located. An RF carrier for each such beam is turned off and on at steps 302, 304, respectively. During steering of each such beam, communication between a conventional reader and a tag is conducted, preferably in accordance with the aforementioned EPC Gen-2 Standard. More specifically, the conventional reader, among other things, selects which tag or tags are going to be interrogated by the reader with a Select command at step 306, and then queries the tag to pick a random slot with a Query command and/or a subsequent, optional QueryAdj command, and/or a subsequent, optional QueryRep command, at step 308. The queried tag responds with a 16-bit random number, i.e., RN16, at step 310. Next, the conventional reader acknowledges the random number selected by the tag with an ACK command at step 312. Next, the tag delivers its payload, i.e., the tag ID, to the reader at step 314 during the steering of each such beam. An inventory round is defined as a time period initiated by a Query command (step 308), and terminated by either a subsequent Query command (which also starts a new inventory round), or a Select command (step 306).

Completing the inventory round for each such beam takes time, e.g., on the order of 10 milliseconds. If each of the aforementioned four secondary receive beams had to undergo its own individual inventory round in succession, then 40 milliseconds would be needed. The more time spent on completing the inventory round for each secondary receive beam, the less time is available for reading all the tags and/or for reading each tag multiple times.

Figure 8:
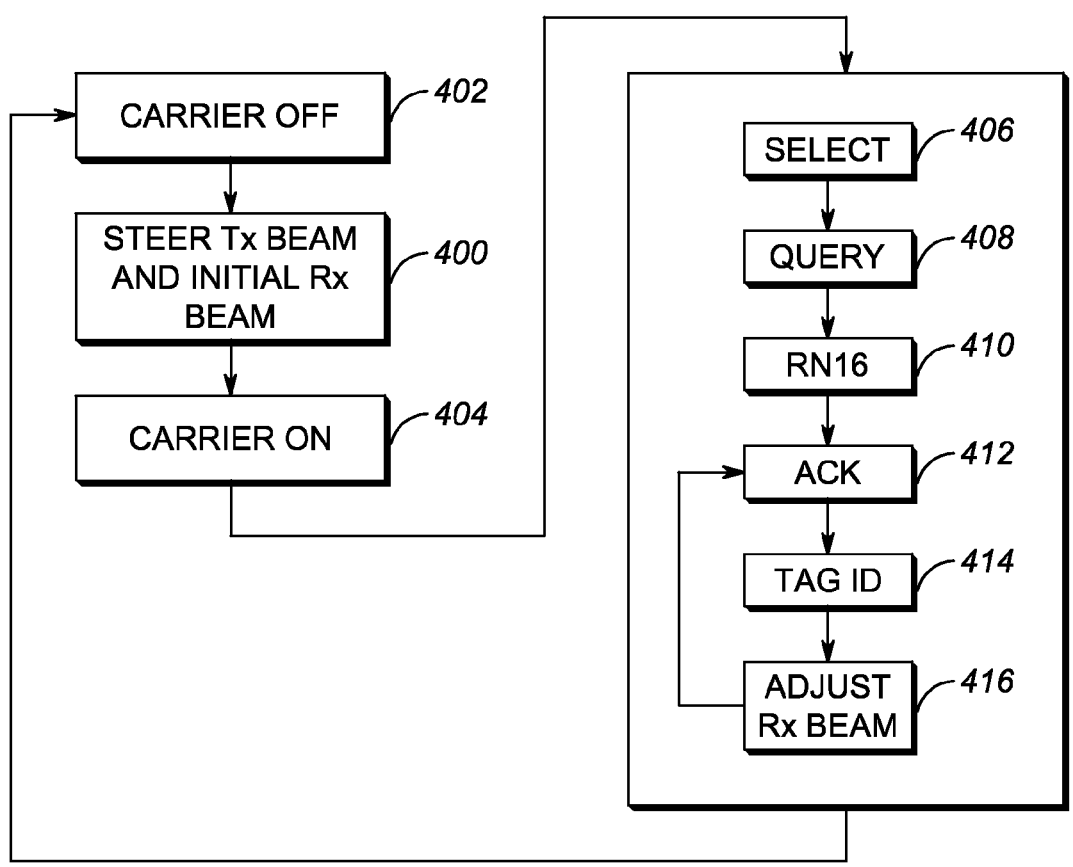
FIG. 8 is a block diagram depicting an inventory round for a primary transmit beam and a primary receive beam, as well as for multiple secondary receive beams, in accordance with the present disclosure.

In accordance with the present disclosure, as shown in FIG. 8, each of the multiple secondary receive beams is cycled through a single inventory round, thereby saving time. More particularly, the primary transmit beam and/or the primary receive beam are steered at step 400 over the controlled area in which the tags are located. An RF carrier for each such beam may be turned off and on at steps 402, 404, respectively. Each such beam is cycled through the aforementioned inventory round. More specifically, under the control of the controller 16, the reader 20 selects which tag or tags are going to be interrogated by the reader 20 with a Select command at step 406, and then queries the tag to pick a random slot with a Query command, and/or a subsequent, optional QueryAdj command, and/or a subsequent, optional QueryRep command, at step 408. The queried tag responds with a 16-bit random number, i.e., RN16, at step 410. Next, the reader 20 acknowledges the random number selected by the tag with an ACK command at step 412. Next, the tag delivers its payload, i.e., the tag ID, to the controller 16 at step 414 during the steering of each such beam.

In a departure from the prior art, the controller 16 at step 416 switches from the primary receive beam to each of the secondary receive beams without repeating the Query command, and/or any subsequent, optional QueryRep and QueryAdj commands, and receives the tag identification at step 414 from the tag during steering of each of the secondary receive beams in succession. Put another way, the controller 16 at step 416 switches to a first secondary receive beam and then retransmits an ACK command to the same tag, and receives the tag ID for that tag. The controller 16 at step 416 next switches to a second secondary receive beam and then retransmits the ACK command to the same tag, and receives the tag ID for that tag on all the remaining secondary receive beams. Four separate inventory rounds have not been incurred. Instead, each secondary receive beam only had to be cycled through the steps 412 and 414, but not steps 408 and 410 again. Some tag IDs can be quite long. Hence, additional time can be saved by truncating the tag IDs. According to this disclosure, the total time needed to cycle through four secondary receive beams for each tag can be reduced by a factor of 3 to 5 times.

As described above, the multiple secondary receive beams may be steered simultaneously or sequentially over a single inventory round, rather than over multiple inventory rounds as in the known art. This is represented in FIG. 6 by the step 209. The less time that it takes for each secondary receive beam to be processed, the greater the number of tags that can be read, and the better the quality of reading a single tag since more measurements can be taken in a given time period.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for rapidly determining true bearings of RFID tags associated with items in a controlled area, comprising:
    an RFID reader having an array of antenna elements and a plurality of RF transceivers; and
    a controller operatively connected to the transceivers, and operative to control the transceivers by executing a tag processing module operative to steer a primary transmit beam over the controlled area by transmitting a primary transmit signal via the antenna elements to each tag, and to steer a primary receive beam at a primary steering angle by receiving a primary receive signal via the antenna elements from each tag,
    the controller being further operative to control the transceivers by executing a bearing processing module operative to steer a plurality of secondary receive beams at different secondary steering angles that are offset from the primary steering angle by receiving a plurality of secondary receive signals via the antenna elements from each tag, and by processing the secondary receive signals to determine a true bearing for each tag, and
    the controller being further operative to control bidirectional communication between the reader and at least one of the tags over a single inventory round in which the at least one tag is read a plurality of times by the primary and the secondary receive beams at different secondary steering angles, wherein the single inventory round is a time period measured from a beginning instant when a Query command is issued to an ending instant when a subsequent Query command or a Select command is issued, and wherein the controller is operative to send an identification request to the at least one tag for each secondary receive beam that is used to read the at least one tag during the inventory round.

2. The system of claim 1, wherein the controller is further operative to simultaneously steer the secondary receive beams, and to control bidirectional communication between the reader and the at least one tag over the single inventory round during simultaneous steering of the secondary receive beams.

3. The system of claim 1, wherein the controller is further operative to sequentially steer the secondary receive beams in succession, and to control bidirectional communication between the reader and the at least one tag over the single inventory round during sequential steering of the secondary receive beams.

4. The system of claim 1, wherein the reader is operative to query the at least one tag to pick a random slot with at least one of a Query command and a subsequent Query Repeat (QueryRep) command, and to acknowledge a random number selected by the at least one tag with an ACK command; and wherein the controller is further operative, once the random number has been acknowledged, to receive a tag identification from the at least one tag during steering of the primary receive beam, and to switch from the primary receive beam to each of the secondary receive beams without repeating the at least one of the Query command and the subsequent QueryRep command, and to receive a tag identification from the at least one tag during steering of each of the secondary receive beams in response to sending the ACK command as the identification request.

5. The system of claim 1, wherein the bearing processing module is operative to steer a first pair of the secondary receive beams at opposite sides of the primary receive beam in elevation, and to process a first pair of the secondary receive signals to obtain a pair of elevation offset signals; and wherein the bearing processing module is further operative to steer a second pair of the secondary receive beams at opposite sides of the primary receive beam in azimuth, and to process a second pair of the secondary receive signals to obtain a pair of azimuth offset signals.

6. The system of claim 5, wherein the bearing processing module is operative to process the elevation offset signals by dividing their difference by their sum to obtain an elevation error signal as an elevation correction to the primary steering angle, and wherein the bearing processing module is operative to process the azimuth offset signals by dividing their difference by their sum to obtain an azimuth error signal as an azimuth correction to the primary steering angle.

7. The system of claim 1, wherein the bearing processing module is operative to steer each secondary receive beam by receiving the secondary receive signals over a plurality of channels; and further comprising, on each channel, a complex multiplier and a programmable device for setting a complex coefficient for the complex multiplier to introduce a weighting factor on each channel to effect steering.

8. A radio frequency (RF) identification (RFID) tag reading system for rapidly determining true bearings of RFID tags associated with items in a controlled area, comprising:
an RFID reader mounted in an overhead location in the controlled area, and having an array of antenna elements and a plurality of RF transceivers;
a server operatively connected to the RFID reader; and
a controller located in at least one of the RFID reader and the server and operatively connected to the transceivers, the controller being operative to control the transceivers by executing a tag processing module operative to steer a primary transmit beam over the controlled area by transmitting a primary transmit signal via the antenna elements to each tag, and to steer a primary receive beam at a primary steering angle by receiving a primary receive signal via the antenna elements from each tag,
the controller being further operative to control the transceivers by executing a bearing processing module operative to steer a plurality of secondary receive beams at different secondary steering angles that are offset from the primary steering angle by receiving a plurality of secondary receive signals via the antenna elements from each tag, and by processing the secondary receive signals to determine a true bearing for each tag, and
the controller being further operative to control bidirectional communication between the reader and at least one of the tags over a single inventory round in which the at least one tag is read a plurality of times by the primary and the secondary receive beams at different secondary steering angles, wherein the single inventory round is a time period measured from a beginning instant when a Query command is issued to an ending instant when a subsequent Query command or a Select command is issued, and wherein the controller is operative to send an identification request to the at least one tag for each secondary receive beam that is used to read the at least one tag during the inventory round.

9. The system of claim 8, wherein the controller is further operative to simultaneously steer the secondary receive beams, and to control bidirectional communication between the reader and the at least one tag over the single inventory round during simultaneous steering of the secondary receive beams.

10. The system of claim 8, wherein the controller is further operative to sequentially steer the secondary receive beams in succession, and to control bidirectional communication between the reader and the at least one tag over the single inventory round during sequential steering of the secondary receive beams.

11. The system of claim 8, wherein the reader is operative to query the at least one tag to pick a random slot with at least one of a Query command and a subsequent Query Repeat (QueryRep) command, and to acknowledge a random number selected by the at least one tag with an ACK command; and wherein the controller is further operative, once the random number has been acknowledged, to receive a tag identification from the at least one tag during steering of the primary receive beam, and to switch from the primary receive beam to each of the secondary receive beams without repeating the at least one of the Query command and the subsequent QueryRep command, and to receive a tag identification from the at least one tag during steering of each of the secondary receive beams in response to sending the ACK command as the identification request.

12. The system of claim 8, wherein the bearing processing module is operative to steer a first pair of the secondary receive beams at opposite sides of the primary receive beam in elevation, and to process a first pair of the secondary receive signals to obtain a pair of elevation offset signals; and wherein the bearing processing module is further operative to steer a second pair of the secondary receive beams at opposite sides of the primary receive beam in azimuth, and to process a second pair of the secondary receive signals to obtain a pair of azimuth offset signals.

13. The system of claim 12, wherein the bearing processing module is operative to process the elevation offset signals by dividing their difference by their sum to obtain an elevation error signal as an elevation correction to the primary steering angle, and wherein the bearing processing module is operative to process the azimuth offset signals by dividing their difference by their sum to obtain an azimuth error signal as an azimuth correction to the primary steering angle.

14. The system of claim 8, wherein the bearing processing module is operative to steer each secondary receive beam by receiving the secondary receive signals over a plurality of channels; and further comprising, on each channel, a complex multiplier and a programmable device for setting a complex coefficient for the complex multiplier to introduce a weighting factor on each channel to effect steering.

15. A radio frequency (RF) identification (RFID) tag reading method of rapidly determining true bearings of RFID tags associated with items in a controlled area, the method comprising:

controlling a plurality of transceivers of an RFID reader having an array of antenna elements operatively connected thereto by having a controller execute a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag;

controlling the transceivers by having the controller execute a bearing processing module operative for steering a plurality of secondary receive beams at different secondary steering angles that are offset from the primary steering angle by receiving a plurality of secondary receive signals via the antenna elements from each tag, and by processing the secondary receive signals to determine a true bearing for each tag;

controlling bidirectional communication between the reader and at least one of the tags over a single inventory round in which the at least one tag is read a plurality of times by the primary and the secondary receive beams at different secondary steering angles, wherein the single inventory round is a time period measured from a beginning instant when a Query command is issued to an ending instant when a subsequent Query command or a Select command is issued; and sending an identification request to the at least one tag for each secondary receive beam that is used to read the at least one tag during the inventory round.

16. The method of claim 15, wherein the steering of the secondary receive beams is performed simultaneously, and wherein the controlling of the bidirectional communication between the reader and the at least one tag is performed over the single inventory round during simultaneous steering of the secondary receive beams.

17. The method of claim 15, wherein the steering of the secondary receive beams is performed sequentially, and wherein the controlling of the bidirectional communication between the reader and the at least one tag is performed over the single inventory round during sequential steering of the secondary receive beams.

18. The method of claim 15, and querying the at least one tag to pick a random slot with at least one of a Query command and a subsequent Query Repeat (QueryRep) command; and acknowledging a random number selected by the at least one tag with an ACK command; and receiving, once the random number has been acknowledged, a tag identification from the at least one tag during steering of the primary receive beam; and switching from the primary receive beam to each of the secondary receive beams without repeating the at least one of the Query command and the subsequent QueryRep command; and receiving a tag identification from the at least one tag during steering of each of the secondary receive beams in response to sending the ACK command as the identification request.

19. The method of claim 15, wherein the steering of a first pair of the secondary receive beams is performed at opposite sides of the primary receive beam in elevation, and wherein the processing of a first pair of the secondary receive signals is performed to obtain a pair of elevation offset signals; and wherein the steering of a second pair of the secondary receive beams is performed at opposite sides of the primary receive beam in azimuth, and wherein the processing of a second pair of the secondary receive signals is performed to obtain a pair of azimuth offset signals.

20. The method of claim 19, wherein the processing of the elevation offset signals is performed by dividing their difference by their sum to obtain an elevation error signal as an elevation correction to the primary steering angle, and wherein the processing of the azimuth offset signals is performed by dividing their difference by their sum to obtain an azimuth error signal as an azimuth correction to the primary steering angle.

* * * * *